UNITED STATES PATENT OFFICE.

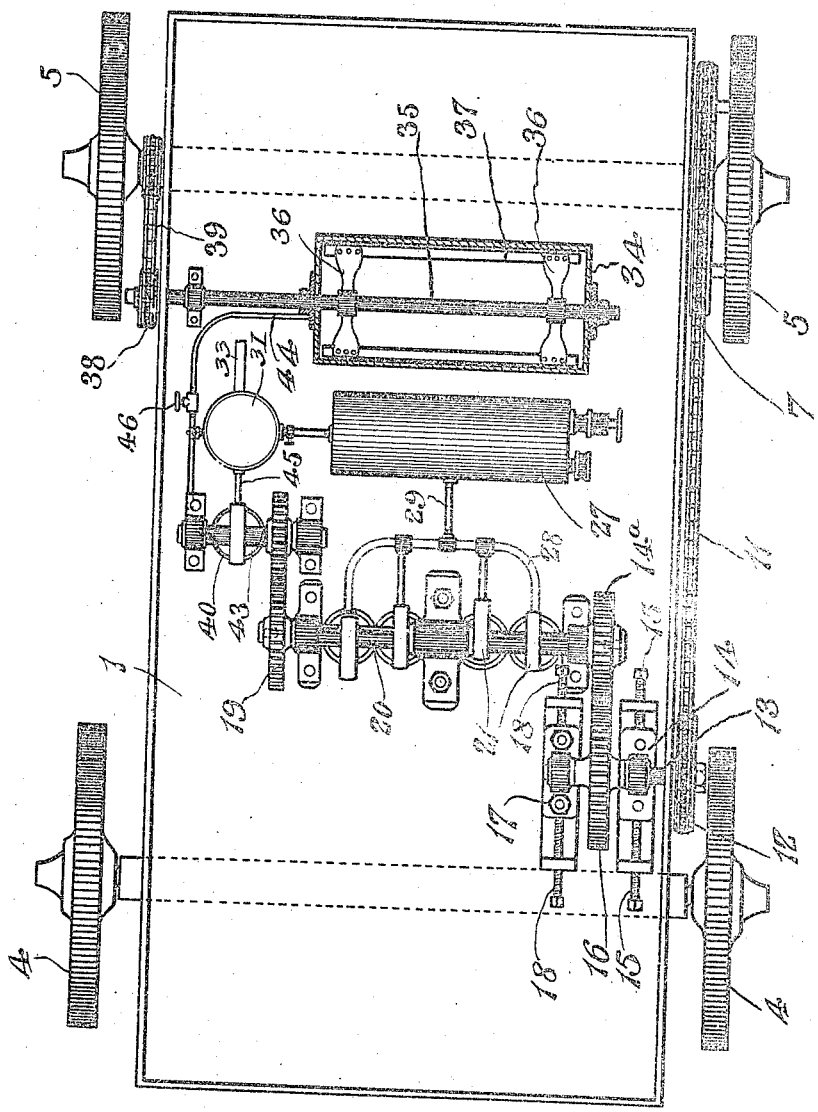

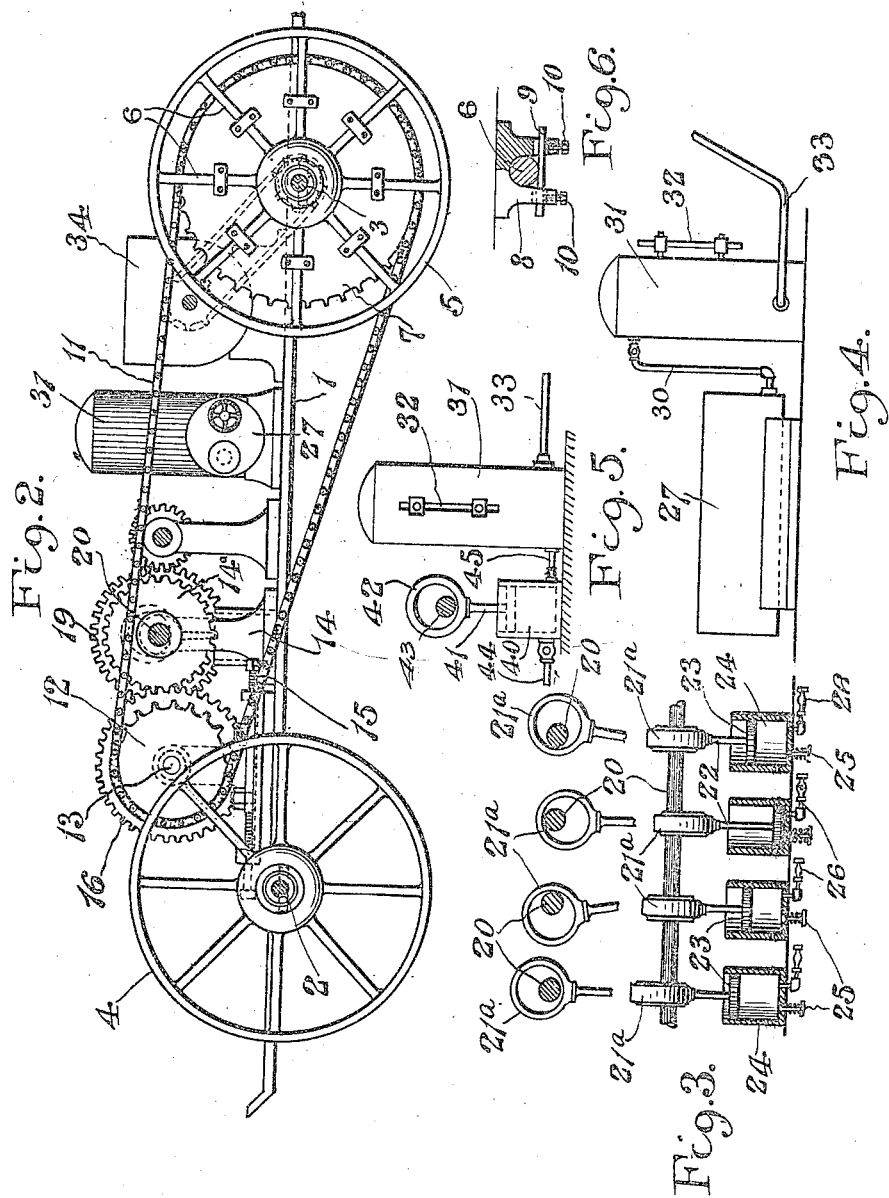

WILLIAM A. McWILLIAMS, OF OAKLAND, CALIFORNIA.

PNEUMATIC SPRAYER.

1,178,329.  Specification of Letters Patent.  Patented Apr. 4, 1916.

Application filed August 14, 1914. Serial No. 856,843.

*To all whom it may concern:*

Be it known that I, WILLIAM A. MCWILLIAMS, a citizen of the United States, residing at Oakland, in the county of Alameda and State of California, have invented certain new and useful Improvements in Pneumatic Sprayers; and I do hereby declare the following to be a full, clear, and exact description of the invention, such as will enable others skilled in the art to which it appertains to make and use the same.

This invention relates to pneumatic sprayers, and one of the principal objects of the invention is to simplify the construction of devices of this kind and to dispense entirely with the gasolene engine usually employed for operating the sprayer and to substitute therefor positively driven means actuated by the ground wheels of the vehicle on which the sprayer is mounted.

Another object of the invention is to provide more simple and efficient means for compressing the air and for placing fluid in a tank in which the air pressure is sufficient to throw a stream for spraying as a result of driving the vehicle to its place of operation.

The foregoing and other objects may be attained by means of the construction illustrated in the accompanying drawings, in which, Figure 1 is a top plan view of a pneumatic sprayer made in accordance with this invention and showing the liquid tank in horizontal section, Fig. 2 is a longitudinal sectional view of the apparatus, Fig. 3 is a sectional view of the air compressor, Fig. 4 is a view in elevation of the reservoir tank and compression chamber, Fig. 5 is a view in elevation of the fluid pump, and the compression chamber and its connections, and Fig. 6 is a detail sectional view showing the manner in which a large sprocket wheel is connected to one of the rear wheels or spokes of the rear wheels of the vehicle.

Referring to the drawings, the numeral 1 designates the vehicle platform mounted on the front axles 2 and the rear axles 3. The front wheels 4 and the rear wheels 5 are mounted on the axles 2 and 3. Connected to the spokes 6 of one of the rear wheels 5 is a large sprocket wheel 7, said sprocket wheel having pairs of projecting studs 8 which straddle the spokes 6, and a clamp plate 9 is connected to each pair of the projections 8 and forced against the corresponding spoke 6 by binding screws 10. A drive chain 11 extends around sprocket wheel 7 and around a similar sprocket of smaller diameter 12 on a stub shaft 13 mounted in an adjustable bearing block 14, said block being adjustable by set screws 15. Mounted on the shaft 13 is gear wheel 16, and at the opposite side of said gear wheel, the bearing block 17 is adjustable by means of the set screws 18. The purpose of the adjustability of this stub shaft is so that the gear wheels may be changed for different sizes to change the capacity of the machine. The gear wheel 16 is in mesh with pinion $14^a$ on a transverse shaft 20 mounted in suitable brackets 21, and mounted on said shaft 20 is a plurality of eccentrics $21^a$, each carrying a stem 22 having a piston head 23 thereon, mounted in a cylinder 24, the said piston and cylinder constituting an air compressor. The cylinder is provided with an inlet check valve 25 and an outlet air pipe 26 provided with a suitable valve communicating with the air reservoir 27 through the pipes 28 and 29. A pipe 30 leads from the air reservoir 27 to the top of a compression tank 31 provided with a gage glass 32 and with a hose 33 provided with a discharge nozzle for spraying.

A tank 34 for the spraying liquid is provided with a shaft 35 carrying arms 36, and connected to the outer ends of said arms are agitator members 37. The shaft 35 is rotated by means of a sprocket wheel 38 on the shaft 35 and a similar sprocket wheel on the axle 3, said sprocket wheels being connected by a drive chain 39.

A pump 40 having its piston rod 41 operated by means of an eccentric 42 mounted on a stub shaft 43 is utilized for pumping the agitated fluid through the pipe 44 to the pump 40 and through the pipe 45 to the tank 31. A globe valve 46 in the pipe 44 may be utilized to relieve the excessive pressure in the compression chamber and to throw the pump out of action when there is sufficient fluid in the compression tank 31.

From the foregoing it will be obvious that as the vehicle is moved over the ground an accumulation of compressed air is stored in the reservoir, and on its arrival at a given point it is ready for use, with the liquid throughly agitated and under sufficient pressure to spray. The travel of the vehicle to another point results in more compressed air being delivered into the reservoir whereby to continue the spraying.

Various changes may be made in the details of construction without departing from the spirit and scope of the invention as defined in the claims, and I would have it understood that this sprayer may be utilized for all spraying purposes and not confined to any specialized line of spraying.

What is claimed is:—

1. A pneumatic sprayer comprising a vehicle mounted on wheels, a platform supported by said wheels of the vehicle, a sprocket wheel carried by the spokes of one of the rear wheels, a stub shaft having a sprocket wheel on its outer end mounted on the front end of said platform, a gear wheel mounted centrally on said stub shaft, an eccentric shaft mounted centrally on the platform having gear wheels on its respective ends, one of said eccentric shaft gear wheels adapted to mesh with the gear wheel of the stub shaft, a plurality of compression pumps mounted beneath said eccentric shaft and connected therewith, a liquid suction pump, means at the free end of the eccentric shaft for driving said suction pump, an air reservoir, a compression tank, a liquid tank, an agitator in said liquid tank, means for connecting the liquid tank and the compression tank respectively with the suction pump, means for connecting the compression pumps with the air reservoir and means for establishing communication between the air reservoir and the compression tank.

2. A spraying device of the character described comprising a combination with a vehicle having a platform mounted thereon, a sprocket wheel secured to the spokes of the rear wheel of said vehicle, a stub shaft mounted at one end of said vehicle body, a sprocket wheel on the outer end of said shaft, a gear wheel mounted centrally upon said shaft, a chain connecting the sprocket wheels together for rotating said shaft, an eccentric shaft mounted centrally on the wagon body and having gear wheels at the respective ends thereof, one of said gear wheels meshing with the gear wheel of the stub shaft, a plurality of compression pumps mounted beneath the eccentric shaft, and operatively connected therewith, an air reservoir, means for connecting the air reservoir with the compression pumps, a compression tank, a liquid suction pump, means for connecting the liquid suction pump to the second gear wheel of the eccentric shaft, means establishing communication between the suction pump and the compression tank, means for connecting the compression tank to the air reservoir, a liquid spraying tank situated on the rear end of said vehicle, means within said tank for agitating the same on movement of the vehicle, and means connecting the liquid spraying tank with the suction pump.

In testimony whereof I affix my signature in presence of two witnesses.

WILLIAM A. McWILLIAMS.

Witnesses:
ALEXANDER G. McWILLIAMS,
WILLIAM J. AHERN.